United States Patent Office 3,697,349
Patented Oct. 10, 1972

3,697,349
THERMOPLASTIC MOULDING COMPOSITIONS AND SHAPED ARTICLES ON THE BASIS OF POLYVINYL CHLORIDE
Hans-Joachim Andraschek and Erich Zentner, Burgkirchen (Alz), Germany, assignors to Farbwerke Hoechst Aktiengesellschaft vormals Meister Lucius & Bruning, Frankfurt am Main, Germany
No Drawing. Filed Oct. 16, 1969, Ser. No. 867,078
Claims priority, application Germany, Oct. 19, 1968, P 18 04 049.8
Int. Cl. C08f *15/00;* B29c *17/00;* B31f *23/10*
U.S. Cl. 156—219       3 Claims

ABSTRACT OF THE DISCLOSURE

Emulsion graft polymers on the basis of vinyl chloride containing specific amounts of known elastomer components are used for the manufacture of plasticizer-free films, sheets or shaped articles which undergo a permanent change in color by deformation, preferably beyond the yield point. The films are especially suitable for labeling and decorating purposes.

---

The present invention relates to transparent, plasticizer-free polyvinyl chloride sheets or films which undergo a permanent change in color (change from transparency to turbidity) by deformation, preferably beyond the yield point, for example by embossing, and have an excellent white fracture especially suitable for the production of distinctly visible letters or other embossings.

In U.S. Pat. 2,925,625 it has been proposed to use for the manufacture of labels, signs, and packaging materials—which fields of application are also very suitable for the compositions of the present invention—specific films of polyvinyl chloride or copolymers of vinyl chloride and vinyl acetate containing stabilizers, lubricants, pigments and fillers. By forming the said plastic films in the cold, especially with the aid of known embossing devices the desired writing is obtained in a strongly contrasting white color.

The process for the manufacture of characters on plastic sheets or films described in the aforesaid patent requires, however, a rigid material of a certain minimum thickness. In the case of thin films the stiffness is not sufficient to produce by deformation characters having a satisfactory sharpness.

Sheets or films in which characters and other images are embossed should be as flexible as possible so as to permit application on uneven substrata. Moreover, flexible films cannot only be applied to plane surfaces but also be used for coating edged objects without an undesired change in color (white fracture) occurring in the areas of bending.

In general, flexible films can be manufactured in a wide range of elasticity by blending polyvinyl chloride or copolymers of vinyl chloride with the most varying plasticizers.

A useful flexibility can only be obtained, however, when the proportion of plasticizer in the total mixture is above the respective solvation limit, i.e. generally above about 15 to 18%. Sheets made of mixtures of this type have, however, no white fracture properties, or the white fracture is so indistinct that the sheets are unsuitable for the production of embossings with change in color.

Moreover, with plasticizer-containing sheets the temperature resistance of the white fracture is so low (about 40 to 50° C.) that for this reason, too, they are unsuitable for the fields of application mentioned above.

Flexible sheets or films having good white fracture properties, i.e. sheets or films which allow of a clear reproduction of characters or other embossings, can be produced by blending polyvinyl chloride with polymers having a low modulus of elasticity, for example chlorinated polyethylene. The sheets or films obtained with the said blends are, however, relatively turbid so that the characters produced by embossing do not differ enough from the original color of the sheet or film.

German Pat. 1,263,554 describes a process which also permits the use of thin and relatively flexible films for labeling purposes. The films which do not have a sufficient stiffness and thickness for the production of a visible change in color are applied, prior to embossing, to thick backing sheets having an appropriate stiffness in flexure so that the thin films in the laminate undergo a deformation beyond the yield point in the embossed areas. The use of the aforesaid auxiliary sheet complicates the process and renders it expensive. The yield point is a constant of the material and is reached when the limit of the elastic range defined by the modulus of elasticity is reached. When the said limit is exceeded reversible elastic changes of shape are no longer possible.

It has now been found that the aforesaid disadvantages can be avoided when for the manufacture of the polyvinyl chloride films, sheets or other shaped articles plasticizer-free emulsion graft polymers are used which contain 5 to 30% by weight, preferably 15 to 25% by weight, calculated on the final polymer, of a known elastomer component on the basis of butadiene and/or isoprene, or halogen-substituted, or higher conjugated dienes, and monomeric vinyl compounds, preferably styrene, acrylonitrile, maleic acid esters, acrylic acid esters and/or methacrylic acid esters.

Graft polymers of this type, the K values of which are preferably of from 60 to 75, are obtained, for example, by the process disclosed in Belgian Pat. 720,291 by emulsion polymerization of vinyl chloride or mixtures of vinyl chloride with other monomeric vinyl compounds copolymerizable with vinyl chloride, in aqueous dispersion in the presence of a known elastomeric latex as specified below by first polymerizing vinyl chloride or a monomer mixture containing vinyl chloride in aqueous emulsion until a conversion of at least 60%, preferably 70 to 85% is reached, then adding the elastomeric latex in an amount such that the final product contains more than 5% and up to 30% by weight, preferably 15 to 25% by weight thereof, calculated on the final product, and continuing polymerization of the total mixture until 95% of the vinyl monomers present have been polymerized.

Suitable monomeric vinyl compounds which can be copolymerized with vinyl chloride for the purpose of the invention are, above all, vinylidene chloride, vinyl ethers, vinyl esters of carboxylic acids, for example vinyl acetate or vinyl propionate, and esters of acrylic acid, methacrylic acid, maleic acid, fumaric acid, or itaconic acid with alcohols containing 1 to 10 carbon atoms in a straight or branched chain. The comonomer is preferably used in an amount such that the vinyl chloride copolymer obtained contains 1 to 10% by weight, more particularly 2 to 5% by weight thereof.

The elastomeric latices used according to the invention are made from copolymers having a diene proportion of more than 45%, especially copolymers of butadiene and/or isoprene or dimethyl-butadiene or halogen-substituted or higher conjugated dienes with monomeric vinyl compounds, preferably styrene, acrylonitrile, maleic acid esters, acrylic acid esters and/or methacrylic acid esters, especially methyl methacrylate or butyl acrylate.

Especially suitable are latices containing copolymers produced by emulsion polymerization and insoluble in hydrocarbons, chlorohydrocarbons, aromatic compounds, cyclohexanes and dimethyl formamide. It is advantageous to prepare an emulsion graft polymer having a K value of 55 to 80, preferably 68 to 78. The plasticizer-free graft polymers may contain known stabilizers, lubricants, fillers and pigments.

In this manner a composition is obtained which meets the requirements of practice and can be used as colorless transparent as well as pigmented transparent sheet of any desired thickness. The production of visible letters or designs is even possible with very thin films so that it is not necessary to use additionally a backing sheet of sufficient stiffness in flexure as proposed in German Pat. 1,263,554. The sheet according to the invention is flexible even in larger thicknesses so that it fits on all unevennesses of the substratum and can be put around edged objects without a change in color occurring. A special advantage resides in the fact that a film or sheet on which letters have been embossed and which has been bent around an edge and glued on adheres to the substratum without detaching, owing to the low resilience. In contradistinction thereto, sheets having a higher stiffness (cf. comparative Examples 1, 3, and 5) automatically detach after some time because of their high resilience.

The sheets made of the composition defined above are flexible, they have a modulus of elasticity preferably below 16,000 kp./cm.$^2$ (DIN 53371), they are highly transparent having a turbidity number preferably below 28‰ (DIN 53490) and the change in color produced by deformation beyond the yield point is stable up to a temperature of 84° C. The stability of the white fracture is preferably above 80° C. As mentioned above, with sheets containing a plasticizer the white fracture disappears at a temperature of 40 to 50° C.

It is surprising that emulsion graft polymers having a content of 0.5 to 5% of elastomeric component yield textured, milky and turbid sheets which are practically free from white fracture or have a white fracture which is too indistinct for the desired fields of application.

When, on the other hand, the components of the emulsion graft polymer of the present invention are simply mixed by mechanical means, for example with 21% of the elastomer described in Example 1, a sheet which has little flexibility and the white fracture of which is not very distinct is obtained. Such sheet is not comparable with sheets of the composition of the present invention.

Therefore, it could not have been expected that the aforesaid excellent properties are obtained when vinyl chloride and the elastomeric component are combined by graft polymerization. It is also surprising that the desired effect is only obtained with a very definite range of concentration of the elastomers. Concentrations outside of the specified range improve other properties such as tensile impact strength or notched impact strength but do not produce a satisfactory white fracture.

To stabilize the graft polymers of the present invention known stabilizer systems, for example organo-tin compounds, known barium/cadmium/calcium/zinc salts, especially of aliphatic or aromatic carboxylic acids, aminocrotonic acid esters, α-phenyl-indole, or diphenyl-thiourea, can be used.

As processing auxiliaries there may be added known lubricants, for example montan wax, high molecular weight fatty acids and the esters thereof, amide waxes, as well as hard paraffin waxes or polyethylene waxes.

The mixtures consisting of graft polymer, stabilizers, lubricants and possibly pigments and fillers are moulded into sheets by calendering or extrusion at an operating temperature of 120 to 200° C., preferably 150 to 180° C., with stationary kneading mass.

The following 6 comparative examples and 2 examples according to the present invention illustrate the differences in the properties of conventional films and films according to the present invention. In the examples the films were moulded in the following manner: the indicated components (parts by weight) were mixed in the cold, gelatinized and homogenized in known manner in a plastificator having for example heated mixers, kneaders and/or mixing rolls, and then made into films on conventional calenders. In all examples the films had a thickness of 0.15 mm. The properties of the individual films are summarized in a table. The measuring methods used in the examples are also indicated in the table.

Example 1 (according to the invention)

A composition was prepared from 100.00 parts of a polyvinyl chloride emulsion graft polymer having a K value of 70 with 21% by weight of an elastomer consisting of 52 parts of butadiene, 31 parts of styrene and 17 parts of methyl methacrylate, which elastomer had been added during polymerization after conversion of 80% of the monomeric vinyl chloride
0.50 part of diphenyl thiourea
2.00 parts of montan wax The film made from the composition had the following properties:

(a) very distinct white fracture
(b) very high flexibility (13,700 kp./cm.$^2$)
(c) high transparency (28 ‰)
(d) good thermal stability of the white fracture (84° C.)

Example 2 (according to the invention)

A composition was prepared from 100.00 parts of a polyvinyl chloride emulsion graft polymer having a K value of 70 with 15% by weight of an elastomer consisting of 48 parts of butadiene, 32 parts of styrene and 20 parts of butyl acrylate, which graft polymer had been made as described in Example 1
1.50 parts of aminocrotonic acid ester
1.50 parts of montan wax The film made from the composition had the following properties:

(a) very distinct white fracture
(b) high flexibility (14,800 kp./cm.$^2$)
(c) good transparency (24 ‰)
(d) good thermal stability of the white fracture (84° C.)

The foregoing plasticized-free polyvinyl chloride films made by calendering or extrusion were distinguished by a high flexibility, a good transparency and a high thermal stability of the white fracture. They were excellently suitable for embossing characters, trademarks and designs.

Comparative Example 1

A composition was prepared from 100.00 parts of suspension polymerized polyvinyl chloride having a K value of 60
1.50 parts of di-n-octyltin-bis-thioglycolic acid isooctyl ester
1.50 parts of montan wax The film made from the composition had the following properties:

(a) faint white fracture
(b) very little flexibility, i.e. high stiffness and high modulus of elasticity (32,000 kp./cm.$^2$)
(c) good transparency
(d) high thermal stability of the white fracture (84° C.)

Comparative Example 2

A composition was prepared from 78.00 parts of suspension polymerized polyvinyl chloride having a K value of 60
22.00 parts of dioctyl phthalate
1.00 part of di-n-octyltin - bis - thioglycolic acid isooctyl ester
1.00 part of montan wax The film made from the composition had the following properties:

(a) very faint white fracture
(b) very high flexibility (5,300 kp./cm.²)
(c) good transparency (14 ‰)
(d) minor thermal stability of the white fracture (50° C.)

Comparative Example 3

A composition was prepared from 79.00 parts of polymerized polyvinyl chloride having a K value of 60
21.00 parts of methyl methacrylate-butadiene-styrene copolymer
1.50 parts of di-n-octyltin-bis-thioglycolic acid isooctyl ester
1.00 part of montan wax The film prepared from the composition had the following properties:

(a) distinct white fracture
(b) low flexibility (25,000 kp./cm.²)
(c) moderate transparency (42 ‰)
(d) good thermal stability of the white fracture (84° C.)

Comparative Example 4

A composition was prepared from 60.00 parts of suspension polymerized polyvinyl chloride having a K value of 60
40.00 parts of chlorinated polyethylene
1.50 parts of di-n-octyltin-bis-thioglycolic acid isooctyl ester
1.00 part of montan wax The film made from the composition had the following properties:

(a) distinct white fracture
(b) very high flexibility (7,100 kp./cm.²)
(c) very poor transparency (strong turbidity=124 ‰)
(d) good thermal stability of the white fracture (80° C.)

Comparative Example 5

A composition was prepared from 100.00 parts of emulsion polymerized polyvinyl chloride having a K value of 70
0.50 part of diphenyl thiourea
4.00 parts of montan wax The film made from this composition had the following properties:

(a) distict white fracture
(b) very poor flexibility (27,500 kp./cm.²)
(c) minor transparency (83 ‰)
(d) good thermal stability of the white fracture (84° C.)

Comparative Example 6

80.00 parts of suspension polymerized polyvinyl chloride having a K value of 60
20.00 parts of a vinyl chloride-vinyl acetate copolymer containing 10% of vinyl acetate
2.00 parts of kaolin
1.50 parts of barium-cadmium stabilizer
0.30 part of montan wax The film made from the composition had the following properties:

(a) distinct white fracture
(b) very low flexibility (29,800 kp./cm.²)
(c) moderate transparency (36 ‰)
(d) good thermal stability of the white fracture (84° C.)

SUMMARY OF THE RESULTS

| Comparative Ex. | White fracture | Flexibility: modulus of elasticity DIN 53371, kp./cm.² | Transparency: turbidity Number DIN 53490 ‰ | Thermal stability of white fracture, °C |
|---|---|---|---|---|
| 1 | Faint | 32,000 | 12 | 84 |
| 2 | Very faint | 5,300 | 14 | 50 |
| 3 | Distinct | 25,000 | 42 | 84 |
| 4 | do | 7,100 | 124 | 80 |
| 5 | do | 27,500 | 83 | 84 |
| 6 | do | 29,800 | 36 | 84 |
| Example: | | | | |
| 1 | Very distinct | 13,700 | 28 | 84 |
| 2 | do | 14,800 | 24 | 84 |

What we claim is:

1. In the process of producing embossments of contrasting appearance in a plastic sheet by cold deformation the improvement according to which the plastic sheet is an unplasticized transparent emulsion graft copolymer of essentially vinyl chloride homopolymer blocks with an elastomeric copolymer of butadiene, styrene, and an acrylate or methacrylate, the elastomeric copolymer content being more than 5 and up to about 30% of the weight of the graft copolymer and the graft copolymer having a K-value from about 55 to about 80.

2. The combination of claim 1 in which the plastic sheet is about 0.15 mm. thick.

3. The process of applying a mark around the edge of an article, which process includes the steps of cold deforming a plastic sheet in accordance with claim 2 to form the desired mark as an embossment and gluing the resulting sheet around the edge of the article.

References Cited

UNITED STATES PATENTS 3,327,022   6/1967   Riou et al. ---------- 260—879
3,330,886   7/1967   Riou et al. ---------- 260—879
3,380,863   4/1968   Silberberg ---------- 156—12

JOSEPH L. SCHOFER, Primary Examiner

R. A. GAITHER, Assistant Examiner

U.S. Cl. X.R.

260—879; 264—284, 293